Patented June 10, 1947

2,421,812

UNITED STATES PATENT OFFICE 2,421,812

METHOD OF PRODUCING CHROMAN COMPOUNDS

Lee Irvin Smith and Herbert E. Ungnade, Minneapolis, Minn., assignors to Regents of the University of Minnesota, Minneapolis, Minn., a corporation of Minnesota No Drawing. Continuation of application Serial No. 211,078, May 31, 1938. This application July 14, 1939, Serial No. 284,458

8 Claims. (Cl. 260—333)

This invention relates to new organic chemical compositions and to methods for producing the same. More particularly this invention relates to cyclic ether compositions of the coumarane and chromane classes and to mixtures of materials including such compositions and to methods of producing such compositions and mixtures from available and relatively economical ingredients notably hydroquinone compounds and allylic halides.

We have discovered that when a hydroquinone compound having vacant at least one position ortho to the hydroxy group is reacted with an allylic halide, reactions take place producing the new compositions and mixtures of the present invention. Thus, when hydroquinone compounds such as substituted hydroquinones, hydroquinone ethers, hydroquinone esters or hydroquinone derivatives, having vacant at least one position ortho to an hydroxy group are reacted with an allylic halide compound, desirably an allylic chloride, a reaction or combination takes place yielding the new and useful compositions and mixtures. The hydroquinone compound contemplated herein may also be designated as alkyl-substituted-para-di-hydroxy-benzenes, and their mono-ethers and mono-esters.

It is, therefore, an object of the present invention to provide the aforementioned methods of producing the described compositions and mixtures and to provide such compositions and mixtures.

More specifically, it is an object of the invention to provide a method of reacting hydroquinone compounds, and an allylic chloride and the compositions resulting from such method.

It is also an object of the invention to utilize any exhibited effect of the herein described processes and/or products and to utilize such processes and/or products in any of their known or hereinafter discovered capacities.

Other and further objects are those inherent in and implied by the processes and products hereinafter described and claimed.

The methods of the present invention may be stated generally as comprising the reaction of hydroquinone compounds such as substituted hydroquinones or hydroquinone derivatives having vacant at least one position ortho to an hydroxy group with allylic halides particularly the allylic chlorides and bromides either with or without catalysts. The substituted hydroquinone compounds may be compounds such as the alkyl substituted hydroquinones bearing one, two or three substitution groups which may be the same or different radicals. The hydroquinone derivatives contemplated for use in the present invention may be hydroquinone ethers such as the methyl, ethyl, propyl, allyl, cyclohexyl or hydroquinone esters such as the acetates, propionates, benzoates and the like.

The process may be carried out without a solvent or in the presence of a solvent such as benzene, petroleum ether, glacial acetic acid, decahydronaphthalene and the like. The reaction may be carried out in an inert atmosphere, or in a reaction vessel from which air has been removed, and may be carried out at atmospheric or super atmospheric pressures.

The allylic halide compounds utilized in the present invention have the general structural formula

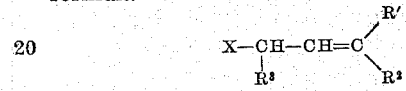

where X is a halogen and R', $R^2$ and $R^3$ are either hydrogen atoms or alkyl radicals, and include substances such as allyl chloride, farnesyl bromide, farnesyl chloride, geranyl bromide, geranyl chloride, 1-chlor-phytene-2, allyl bromide, crotyl chloride, crotyl bromide, 1-bromphytene-2 and similar allylic halide compounds having the structure given.

According to the method of the present invention, the hydroquinone compound ingredient is reacted with the allylic halide under suitable conditions, usually with heat and sometimes under pressure. After a suitable reaction period the resulting compositions are separated and then purified.

The methods are illustrated by the following specific examples which must, however, not be construed as limiting the scope of the invention herein claimed.

Example I

An example of the principal process of the invention is the reaction between trimethyl hydroquinone and the simplest allylic bromide which is allyl bromide.

A mixture of 0.1 gram of trimethyl hydroquinone (sometimes known as pseudocumohydroquinone) and 0.1 cc. of allyl bromide which is a liquid and hence acts as a solvent for the crystalline trimethyl hydroquinone, is heated in a sealed tube at 110° C. After five hours of heating, the tube is cooled and opened, ethyl ether is added and acts as a solvent for the resultant reaction mass. After filtration the ether is evaporated. A crystalline residue of 0.07 gram, representing the first extraction only, resulted. The hydrobromic acid which is also produced as a product of the reaction and which establishes a pressure in the reaction tube is vaporized with the ethyl ether.

In this reaction an amount of allyl bromide was used which is in excess of the stoichiometric equivalent, based upon the trimethyl hydroquinone present. This is desirable in order to use all of the crystalline trimethyl hydroquinone, which would otherwise remain and contaminate the resultant end product.

The equation of the reaction and structure of the end product are submitted to be as follows:

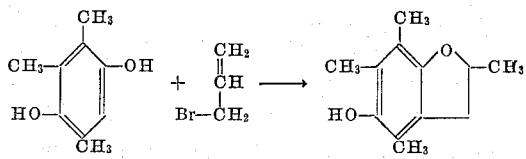

The resultant crude product is a coumaran, specifically 2, 4,6,7 tetramethyl 5 hydroxy coumarane and is a white crystalline compound having a melting point of 121–121.5° C.

*Example II*

When gamma-gamma disubstituted allylic halides, having the general formula

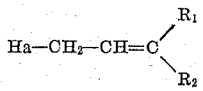

where Ha represents the halide atom and R' and R² are alkyl radicals, are substituted in place of gamma-unsubstituted allylic halides, a six-membered ring (chromane) results, rather than the five-membered ring (coumaran), as was the case in Example I. This reaction is illustrated by the following equation:

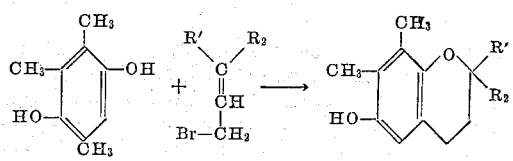

The resulting product being a 2-2- disubstituted 6 hydroxy chromane.

The reaction of trimethyl hydroquinone with gamma-gamma dimethyl allyl bromide is an example of this type of reaction. When one gram of trimethyl hydroquinone is heated with about three grams of crude gamma-gamma dimethyl allyl bromide in a sealed tube at 140° C. a reaction ensues. Hydrobromic acid results as one of the products of the reaction, and as in Example I, produces a pressure in the sealed tube. When the reaction has proceeded for four hours, the tube is cooled and opened and the mixture is extracted with ethyl ether which serves to dissolve the principal resultant ingredient. The ether solvent is then evaporated and the residue recrystallized from dilute aqueous ethyl alcohol. The crude first crop yield according to this procedure was 0.7 gram of white crystalline material having a melting point of 89–90° C. The product in this instance is 2,2,5,7,8 pentamethyl 6 hydroxy chroman. When the product made in accordance with example was fed to properly conditioned female test rats, it was found to exhibit vitamin E activity in single 100 mg. doses.

*Example III*

When 1-brom-phytene-2 is used as the gamma-gamma disubstituted allylic halide the reaction proceeds as illustrated generically in Example II.

Thus when 5 grams of crude 1-brom-phytene-2 and 2 grams of trimethyl hydroquinone are heated in a sealed tube at 125° C. a reaction takes place which after four hours yields a dark liquid mass. Hydrobromic acid which is developed during the reaction establishes a pressure in the sealed reaction tube, as in the reactions set forth in Examples I and II. The reaction tube is cooled and opened after four hours of heating and the mixture is dissolved in ethyl ether and filtered. The ether solution is then thoroughly washed by shaking with water. The washing serves to remove the hydrobromic acid, and is repeated until the wash water is no longer acid to litmus. The ether solution is then dried over sodium sulphate and after drying the ether is evaporated. The residue, which is a dark brown liquid, is then distilled. The boiling point, in a vacuum of $1 \times 10^{-6}$ millimeters of mercury as determined with a thermometer in the liquid, was about 145° C. The final product of the foregoing process is a thick, viscous, pale yellow liquid. It is sensitive to air, oxidizing to a dark brown liquid, and it is therefore necessary to keep it in an inert atmosphere such as nitrogen, or in a sealed evacuated container.

The amount of 1-brom-phytene-2 used in the described reaction is slightly in excess of the stoichiometrically equivalent amount, based upon the amount of trimethyl hydroquinone present.

The reaction and structure of the resultant product can probably be represented by the following reaction:

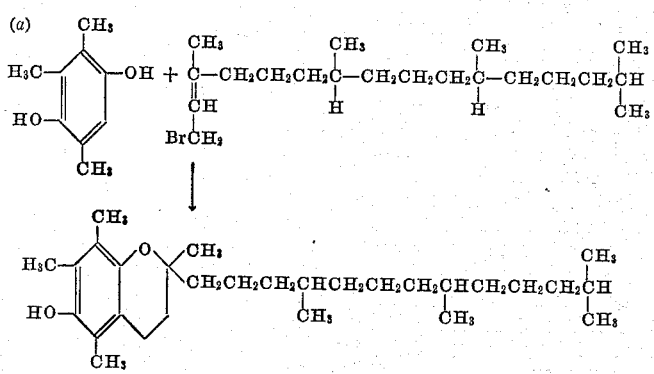

The product produced in accordance with the present example is a pale yellow fairly viscous oil and when biologically assayed for its vitamin E activity was found to be 100% active in 3 mg. doses. That is to say, when the product of this example was fed in single 3 mg. doses to standardized conditioned female test rats, litters of live young were produced in 100% of all rats fed, and the activity of the product was equal, weight for weight, to natural alpha tocopherol.

However, the product of the present example is not identical with natural alpha tocopherol since the former is racemic (non-rotatory) about the number two carbon atom, while the latter is rotatory about the same. The new product of this procedure may thus, with reason be known as racemic alpha tocopherol.

The non-identity is also evidenced by the fact that the allophanate derivatives of the product produced by this example and the allophanate derivatives of natural alphatocopherol melt at 168–170° C. and 157–160° C. respectively, and the melting point of mixtures of allophanate derivatives is between these melting points.

Example IV

A mixture of 2 grams meta xylohydroquinone and 6.5 grams 1-brom phytene-2 was heated in a sealed tube at 120° C. for 3 hours. The crude product was extracted with ethyl ether and unreacted hydroquinone was washed out with 1% aqueous potassium hydroxide solution. The ether layer was then washed with water and dried over sodium sulphate. The ethyl ether was then distilled off and the residue distilled in a molecular still, boiling taking place at 120–130° C. at $1 \times 10^{-6}$ mm. pressure, the boiling temperature being taken with the thermometer in the liquid.

The thus distilled product was a pale yellow oil, gave a positive phenol test thus showing the presence of a free hydroxyl group, reduced silver nitrate in methanol.

The product when fed to properly conditioned female test rats evidenced vitamin E activity in single 20 mg. doses in 100% of all animals fed.

Example V

A mixture of 2 grams para xylohydroquinone and 6 grams 1-brom phytene-2 was heated in a sealed tube at 150° C. for 5 hours. The crude product was purified in the manner set forth in Example IV. The product boiled at 145–150° C. in the molecular still, was light yellow in color, very viscous, and was believed to be a mixture.

Example VI

As an example of the use of a reaction catalyst, 0.1 gram of trimethyl hydroquinone may be reacted with 0.1 cc. allyl bromide in the presence of several percent of zinc chloride. The reaction mixture is heated to 110° C. in a sealed tube for five hours. The resultant product which is somewhat less pure than that in Example I is extracted with ethyl ether and purified as in Example I.

As a further example of the manner in which the reaction is carried out with the xylohydroquinone compounds the following is given.

Example VII 5 grams of meta xylohydroquinone and 10 cc. allyl bromide are sealed in a Carius tube and heated to 150° C. for three hours. The product is dissolved with ethyl ether and steam distilled. Only a small portion of the product is removed upon steam distillation and the bulk of the product which resisted steam distillation is extracted with ether, which was then removed by evaporation and distillation under vacuum from a sausage flask, the distillation pressure being approximately 10 millimeters of mercury. The distillate consists of a pale yellow viscous oil, which is believed to be largely a diallylation product having a probable structural formula as follows:

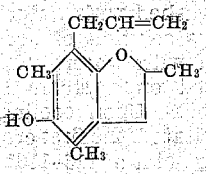

together with the monoallylation product:

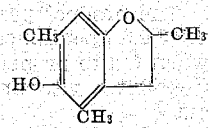

In the foregoing examples, the allyl halides used were the bromides, but other halides may be used with equal facility. As an example of the manner in which the invention may be carried out with other halides, particularly the chlorides, the following is given:

Example VIII

A mixture of 1 gram trimethyl hydroquinone, and 5 cc. allyl chloride was sealed in a Carius tube. The tube was then heated to 150° C. for three hours and upon opening of the tube, a considerable quantity of hydrogen chloride gas escaped. The resultant reaction mixture was dissolved in ethyl ether and the ether solution steam distilled. 600 mg. of a crystalline product was filtered from the distillate and was further purified by recrystallization from petroleum ether. The thus purified product had a melting point of 130.6–131° C. and is believed to be 2, 4, 6, 7-tetramethyl-5 hydroxy coumarane, and has the following formula:

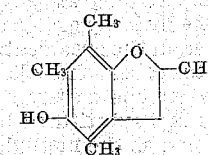

Example IX

A mixture of 1 gram trimethyl hydroquinone and 4 cc. of pure crotyl chloride was sealed in a Carius tube and heated to 150° C. for four hours. The product was disolved out with ethyl ether. A crystalline product remained after evaporation of the ether. The crystallized product was further purified by recrystallization from petroleum ether, the yield being approximately 400 mg. After further purification by recrystallization from petroleum ether the crystalline product had a melting point of 117–117.5° C., and is believed to consist predominately of 2,3,4,6,7-pentamethyl-5 hydroxy coumarane.

If desired, any of the foregoing reactions may be carried out at atmospheric pressure providing the reaction mixture is protected by a non-oxidizing atmosphere. These examples also illustrate the use of catalysts and solvents for the reacting ingredients. As examples of such procedures, the following are given:

Example X

Thus, a mixture of 4 grams trimethyl hydroquinone, 5 cc. pure crotyl chloride and 3 grams zinc chloride in 80 cc. of dry petroleum ether having a boiling range of 90–100° C., was prepared and dry nitrogen gas passed therethrough. The mixture was heated under reflux for five hours. Immediately upon heating hydrogen chloride was evolved. The reaction mixture was then cooled and ethyl ether added. The solution was then washed with water and then with a dilute aqueous solution of sodium hydroxide and then again with water. The dry solution was concentrated on a steam bath and then permitted to cool. Upon cooling, a crystalline substance precipitated, the first crop being 700 mg. having a melting point of 115–116° C. and the second crop being 1.1 grams having a melting point of 104–105.5° C. The product probably consists predominantly of 2,3,4,6,7 pentamethyl 5-hydroxy coumaran, and when fed to properly conditioned female test rats exhibit a vitamin E activity in single 50 mg. doses.

Many of the products especially the liquid ones, prepared in accordance with the present invention are readily oxidized and oxidation and loss of effectiveness of resultant products may be resisted by conversion of the product to esters. Thus, the acetates, benzoates, palmitates, and the like esters may be prepared. As an example of such procedure the following is given:

*Example XI*

The product resulting from the reaction of trimethyl hydroquinone and crotyl chloride prepared in accordance with Example IX hereof was acetylated by boiling with an excess of acetic anhydride. The resultant acetate was precipitated by dilution with water and the crystalline product filtered off. The melting point of the acetate compound was 70.5–71° C.

Catalysts may be used in any of the foregoing procedures, zinc chloride, aluminum chloride, mercuric chloride being preferred.

In any of the foregoing procedures a hydroquinone compound having at least one position vacant ortho to the hydroxy group, and where this phraseology is used in the specification and claims it is intended to cover the alkyl substituted compounds such as the methyl, ethyl, propyl, amyl or the like alkyl substituted hydroquinones, the monoethers such as the methyl, ethyl, propyl, allyl, cyclohexyl or the like monoethers, and the monoesters, such as acetates, propionates, benzoates or the like. Where the ether or ester type of compounds are used, the substituent ether and ester groups may be left in the finished product or cleaved as desired. As to the allyl halide, it is preferable to use the bromides, or the less expensive and equally effective chlorides. The iodides are less efficacious since the reaction is adversely affected by the hydriodic acid evolved.

Products made by the foregoing procedures are active anti-oxidants when a free hydroxyl group is present, and are useful for the purposes to which such compounds have heretofore been utilized. The esters of the resultant products are more stable than the unesterified products and the esters, for example, the acetates, are useful where oxidation is to be resisted.

In general the absorption curves closely parallel the absorption curves of tocopherols derived from natural sources and indicate that the compounds of this invention may be identified with the natural products and are similarly useful. The term "tocopherol" was introduced in the literature by Evans, Emerson and Emerson, Journal of Biological Chemistry, vol. 113, p. 321 (1936), and refers to naturally occurring substances having biological (vitamin E) activity.

The present application is a continuation of application Serial No. 211,078, filed May 31, 1938.

It is obvious that many variations may be made in the procedures herein set forth without departing from the spirit of the invention described and claimed.

We claim:

1. A process for producing chromans which comprises reacting a gamma-gamma-dialkyl-substituted allylic halide having a double bond in the beta-gamma position with an aromatic compound containing a free hydroxyl group and an unsubstituted position ortho to said hydroxyl group and selected from the group consisting of alkyl-substituted-para-di-hydroxy-benzenes, and their mono ethers and mono esters, in the presence of an acidic substance.

2. A process for producing chromans which comprises heating a gamma-gamma-dialkyl-substituted allylic halide having a double bond in the beta-gamma position with an aromatic compound containing a free hydroxyl group and an unsubstituted position ortho to said hydroxyl group and selected from the group consisting of alkyl-substituted-para-di-hydroxy-benzenes and their mono ethers and mono esters, in the presence of a non-oxidizing gas, and in the presence of an added acidic substance.

3. A process for producing chromans which comprises heating a gamma-gamma-dialkyl-substituted allylic halide having a double bond in the beta-gamma position with an aromatic compound containing a free hydroxyl group and an unsubstituted position ortho to said hydroxyl group and selected from the group consisting of alkyl-substituted-para-di-hydroxy-benzenes and their mono ethers and mono esters, and a solvent, in the presence of an acidic catalyst.

4. A process for producing chromans which comprises heating a gamma-gamma-dialkyl-substituted allylic halide having a double bond in the beta-gamma position with an aromatic compound containing a free hydroxyl group and an unsubstituted position ortho to said hydroxyl group and selected from the group consisting of alkyl-substituted-para-di-hydroxy-benzenes and their mono ethers and mono esters, in a sealed vessel.

5. A process for the production of chromans which comprises reacting trimethyl hydroquinone and a gamma-gamma-di-alkyl-substituted allylic halide having a double bond in the beta-gamma position, in the presence of an acidic substance.

6. A process for producing chroman compounds comprising reacting a gamma-gamma-di-alkyl substituted allylic halide having a double bond in the beta-gamma position with an alkyl-substituted para-di-hydroxy benzene having an unsubstituted position ortho to a hydroxy group, under acidic conditions.

7. The process of claim 6 and in which an added acidic substance is employed.

8. The process of claim 6 and in which zinc chloride is employed.

LEE IRVIN SMITH.
HERBERT E. UNGNADE.

REFERENCES CITED

The following references are of record in the file of this patent:

FOREIGN PATENTS

| Number | Country | Date |
|---|---|---|
| 268,099 | Germany | 1913 |
| 279,864 | Germany | 1914 |

(References on following page)

| Number | Country | Date |
|---|---|---|
| 374,142 | Germany | 1923 |
| 394,797 | Germany | 1924 |

OTHER REFERENCES

Karrer, "Helv. Chemica Acta," 21, pages 520–25 (1938), also pages 309–13, 820–25, 1234–40, 1756–59.

Smith, "Journal Amer. Chem. Soc.," 55, pages 4151–3.

Hahn, "Chemical Abstracts," 23, pages 2705–6.

Ferholz, "Journal of American Chem. Soc.," 60, March, 1938, pages 700–05.

Evans et al., "Journal of Biological Chemistry, vol. 113 (1936), pages 321–332.

Olcott et al., "Journal of Biological Chemistry," vol. 104 (1934), pages 423–425.

Karrer, "Organic Chemistry," trans. by Mee, Nordman Pub. Co., New York, 1938, pages 87–96, 678.